(12) United States Patent
Junge et al.

(10) Patent No.: US 8,887,672 B2
(45) Date of Patent: Nov. 18, 2014

(54) WATER HEATER CONTAINING A PHASE CHANGE MATERIAL

(75) Inventors: Brent Alden Junge, Evansville, IN (US); John (Jack) Joseph Roetker, Louisville, KY (US); Joseph Anthony Tobbe, Louisville, KY (US); Blake Philip Bomar, Louisville, KY (US)

(73) Assignee: General Electric Company, Schenectady, NY (US)

( * ) Notice: Subject to any disclaimer, the term of this patent is extended or adjusted under 35 U.S.C. 154(b) by 637 days.

(21) Appl. No.: 12/897,102

(22) Filed: Oct. 4, 2010

(65) Prior Publication Data

US 2011/0239673 A1 Oct. 6, 2011

(51) Int. Cl.
*F25B 27/00* (2006.01)
*F24H 4/04* (2006.01)
*F28D 20/02* (2006.01)
*F24H 1/20* (2006.01)
*F24H 7/02* (2006.01)

(52) U.S. Cl.
CPC ............... *F28D 20/023* (2013.01); *F24H 4/04* (2013.01); *F24H 1/202* (2013.01); *F24D 2220/10* (2013.01); *Y02E 60/145* (2013.01); *F24H 7/0241* (2013.01); *F28D 20/02* (2013.01)
USPC .............. 122/13.01; 165/104.21; 165/104.26; 392/441

(58) Field of Classification Search
USPC ....................... 122/13.01; 165/104.21, 104.26
See application file for complete search history.

(56) References Cited

U.S. PATENT DOCUMENTS

| | | | | |
|---|---|---|---|---|
| 4,508,101 A | * | 4/1985 | Carter et al. | 126/618 |
| 5,680,898 A | * | 10/1997 | Rafalovich et al. | 165/236 |
| 5,687,706 A | * | 11/1997 | Goswami et al. | 126/263.01 |
| 5,746,269 A | * | 5/1998 | Torii et al. | 165/10 |
| 5,853,045 A | * | 12/1998 | Patry et al. | 165/10 |
| 6,047,106 A | | 4/2000 | Salyer | |
| 6,131,644 A | * | 10/2000 | Kohara et al. | 165/10 |
| 6,233,958 B1 | * | 5/2001 | Mei et al. | 62/238.7 |
| 6,493,507 B2 | * | 12/2002 | Salyer | 392/341 |
| 2002/0121362 A1 | * | 9/2002 | Gregory | 165/148 |
| 2003/0131623 A1 | * | 7/2003 | Suppes | 62/324.1 |
| 2008/0314563 A1 | * | 12/2008 | Filippi et al. | 165/104.21 |

FOREIGN PATENT DOCUMENTS

GB 2267962 A * 12/1993
WO 2009021841 A1 2/2009

* cited by examiner

*Primary Examiner* — Kang Hu
*Assistant Examiner* — Nathaniel Herzfeld
(74) *Attorney, Agent, or Firm* — Global Patent Operation; Douglas D. Zhang

(57) ABSTRACT

An appliance includes a water heater storage tank, a heating assembly configured to heat water within the water heater storage tank, and a heat exchange device disposed within the heat storage unit in a fixed relationship relative to a position of the heating assembly. The heat exchange device includes a hollow object and a phase change material within the hollow object.

15 Claims, 8 Drawing Sheets

Smaller Hybrid Water Heater with PCM balls and screen to keep balls away from heating elements Tubes in line (all disks the same)

Staggered Tubes (Higher heat transfer requires two types of disks)

WATER HEATER CONTAINING A PHASE CHANGE MATERIAL

BACKGROUND OF THE INVENTION

The present disclosure generally relates to appliances, and more particularly to a water heater storage tank that contains a phase change material.

The typical water heater generally comprises an electric resistance element as the primary heater. Such systems tend to consume large amounts of energy and are not energy efficient. As an alternative to less efficient water heating systems "hybrid" heating systems have been introduced. A hybrid water heater generally refers to a heat pump that includes an additional heating element as an auxiliary heater. The term "hybrid" generally refers to any number of heating configurations, such as gas electric or heat pumps. As an example, a "hybrid" system could include an electric heat pump that utilizes relatively low amounts of power, such as for example approximately 1500 watts, that is supplemented with, or uses an electric resistance element as an auxiliary heater. Such an electric resistance element can utilize approximately 3000-4500 watts. Heat pump water heaters produce heat very efficiently, but very slowly. A typical heat pump water heater might move approximately two watts of heat for every one watt of electrical power when heating water slowly. When the demand for hot water increases, the heat pump cannot meet the high heating demand and the heat pump is supplemented by resistive heat, which generally only produces approximately one watt of heat for every watt of electrical power used. To avoid the need for resistance heat, a larger water tank can be used to store additional hot water, but this increases cost and requires more space than is available in many houses.

Currently, when a consumer runs out of hot water, one option is to turn up the water temperature. A higher temperature may require a lower percentage of hot water when taking a shower or bath, and thus reduce the hot water demand. However, the increase in the hot water temperature setting will increase energy use and cost.

Storing heat in a phase change material ("PCM") can allow a water heater to produce a higher percentage of the heat using the heat pump, because more heat is stored and is ready for high demand periods. A phase change material is a material that is in a solid phase at low temperatures and a liquid phase at higher temperatures. An exemplary phase change material is PureTemp™, developed by Entropy Solutions of Minneapolis, Minn. As the phase change material is heated, its temperature increases until it reaches its melting temperature. At its melting temperature, the phase change material remains in the solid phase while it absorbs a fixed amount of heat, generally understood as the "latent heat of fusion." Once the phase change material absorbs the fixed amount of heat, the phase change material changes phase from solid to liquid. As heat is removed from the phase change material, its temperature decreases until the phase change material's melting temperature is reached. The phase change material remains in the liquid phase until it releases an amount of heat equal to the latent heat of fusion. As the phase change material continues to lose heat, it changes from the liquid to solid phase. The phase change material can store relatively large amounts of heat without having to be heated to high temperatures. The storage of heat in a water heater or storage unit using a phase change material allows the size of the water heater to be reduced, which reduces heat loss and promotes energy savings.

However, in a situation such as a water storage unit, the phase change material needs to be held in containers that provide a large heat transfer surface area and a large heat transfer coefficient between the container and the water. The arrangement of the phase change material within the cylinder is important in order to prevent the water from bypassing the phase change material, which would reduce the ability and effectiveness of the phase change material to heat the water in the water storage unit.

Low energy use is an important attribute in the design and purchase of appliances. A small exterior volume is important in the purchase of a water heater. Many water heaters are stored in closets with limited volume. A smaller volume or sized water heater will allow the heater to fit in a larger percentage of houses. It would be advantageous to effectively transfer heat from a phase change material to the water and increase the energy storage density for a given size tank or footprint, and water storage temperature.

A potential problem in using phase change material in a water heater is its combination with the resistance or resistive element that is used to heat the water in a water heater. If the resistive element comes in contact with the phase change material, or the container therefor, damage can occur. Thus, the phase change material in a water heater storage tank needs to be kept away from the resistive heater to prevent damage to the phase change material and heater. It is also necessary to prevent damage to the phase change material in the event of a water leak.

Accordingly, it would be desirable to provide a system that addresses at least some of the problems identified above.

BRIEF DESCRIPTION OF THE INVENTION

As described herein, the exemplary embodiments overcome one or more of the above or other disadvantages known in the art.

One aspect of the exemplary embodiments relates to an appliance. In one embodiment, the appliance includes a water heater storage tank, a heating assembly configured to heat water within the water heater storage tank, and a heat exchange device disposed within the heat storage unit in a fixed relationship relative to a position of the heating assembly. The heat exchange device includes a hollow object and a phase change material within the hollow object.

Another aspect of the disclosed embodiments relates a water heater for heating water. In one embodiment the water heater includes a fluid storage container, a heating element for heating water disposed within the fluid storage container, and a heat exchange member disposed within the fluid storage container, the heat exchange member containing a phase change material, the heat exchange member being disposed in a fixed and spaced-apart relationship from the heating element.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
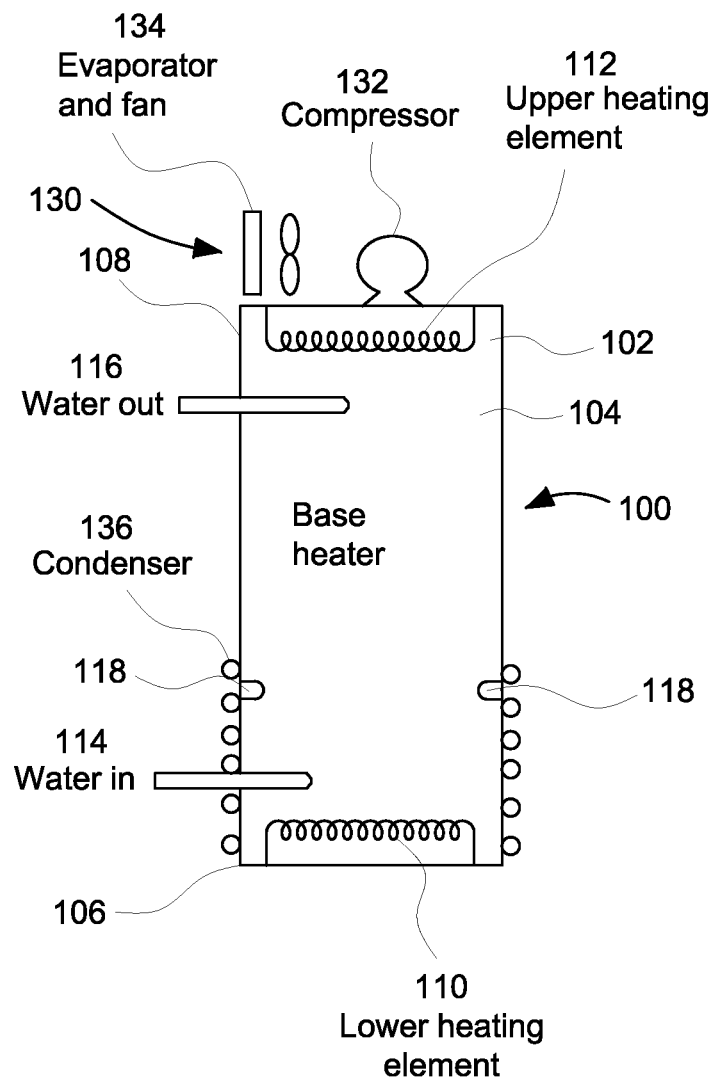
FIG. 1 illustrates an appliance in accordance with aspects of the disclosed embodiments.

Referring to FIG. 1, an exemplary appliance such as a water heater storage tank in accordance with the aspects of the disclosed embodiments is generally designated by reference numeral 100. The aspects of the disclosed embodiments are generally directed to a water heater storage tank that includes a heating element or unit and a heat exchange unit. The heat exchange unit according to the disclosed embodiments is a container that includes a phase change material. The use of a phase change material in the water heater storage tank 100 allows more heat to be stored in the water heater storage tank 100. The heat exchange unit described herein maximizes heat transfer to the water as the water passes through the water heater storage tank 100. Thus, the consumer can operate the water heater at a lower temperature and still have an ample supply of hot water available. When the water heater storage tank 100 is a heat pump configuration, operating at a lower temperature utilizes a more efficient heat pump cycle and also minimizes heat loss, which saves energy.

As is shown in FIG. 1, the appliance 100 is generally in the form of a heat storage tank or unit for heating and storing a fluid such as water. In one embodiment, the appliance 100 comprises a water heater, such as for example, a hybrid hot water heater. In the embodiments described herein, the term "hybrid" water heater is generally meant to mean an electric heat pump with an electric resistance element as an auxiliary heater. As will be understood, the term "hybrid" water heater can also encompass other water heating configurations such as for example electric, gas and heat pump water heating configurations.

As is shown in FIG. 1, in one embodiment, the appliance 100, referred to herein as a water heater storage tank 100, generally includes an enclosure 102 defining a fluid reservoir or chamber 104 therein. The enclosure 102 is substantially cylindrical in form and is typically insulated.

In the example of FIG. 1, a first or lower heating element 110 and a second or upper heating element 112 are disposed within the chamber 104. The heating elements 110, 112 are configured to add heat to the chamber 104. Although two heating elements are shown in the example of FIG. 1, in alternate embodiments, any suitable number of heating element(s) can be used. For example, in one embodiment, the water heater storage tank 100 include a single heating unit or element. The orientation of the heating elements 110, 112 relative to the chamber 104 is generally shown as substantially horizontal in the example of FIG. 1. In alternate embodiments, the heating element(s) can be disposed in any other suitable orientation, such as for example, a substantially vertical orientation.

The chamber 104 has a lower portion 106 and an upper portion 108. Cold water typically enters the chamber 104 from the lower portion 106 and moves upwards towards the upper portion 108 as the chamber 104 fills. In one embodiment, the water in the chamber 104 is heated as it moves from the lower portion 106 towards the upper portion 108. An inlet tube 114 is disposed at the lower portion of the chamber 104 and generally allows for the flow of a fluid, such as water, into the chamber 104. Generally, the inlet tube 114 is coupled to a water supply that provides water into the chamber 104 for heating. An outlet tube 116 is disposed along the upper portion 108 of the chamber 104, and allows for the flow of the heated fluid out of the chamber 104.

In one embodiment, the water heater storage tank 100 includes a heat pump system 130. In one embodiment, the heat pump system 130 includes a compressor 132, evaporator/fan 134 and condenser 136. The evaporator/fan unit 134 draws in ambient air from the surroundings. The condenser 136 transfers heat into the chamber 104 to heat the fluid contained therein, as will be generally understood.

The aspects of the disclosed embodiments are directed to increasing the efficiency of the water heater storage tank 100 by maximizing the heat transfer to the water as it passes through the water heater storage tank 100. The incorporation of a phase change material in the water heater storage tank 100 allows the size of the water heater storage tank 100 to be reduced while increasing the ability to supply hot water. In one embodiment, referring to FIG. 2, a water heater storage tank 100 incorporating a heat exchange member or device 200 is shown. In one embodiment, the heat exchange device 200 comprises a container assembly 202 that is filled with a phase change material 204. The container assembly(s) 202 are disposed within the chamber 104. In one embodiment, the container assembly 202 may be spherically shaped, resembling a ball, which will herein be referred to as a PCM ball 212. In alternate embodiments, the shape of the container assembly 202 can be any suitable shape that enhances heat transfer between the phase change material 204 within the container assembly 202 and the water within the chamber 104. The material for the container 202 is generally includes any material suitable for contact with potable water.

In one embodiment, a lower retaining screen member 206 and an upper retaining screen member 208 are also disposed within the chamber 104 to maintain the container(s) 202 in a pre-determined position within the chamber 104. The positioning of each of the lower retaining screen member 206 and the upper retaining screen member 208 generally defines the outer ends or edges of the heat exchange device 200 and maintains each of the containers 202 a suitable distance from each of the lower and upper heating elements 110, 112, respectively. In one embodiment, each of the lower and upper retaining screen members 206, 208 includes a mesh type material, which allows the water to pass through the mesh. A mesh size of the material for each retaining screen member 206, 208 is generally sufficient to allow an adequate flow of water to pass through each screen member 206, 208, while preventing the containers, or PCM balls 212 from passing through.

Figure 2:
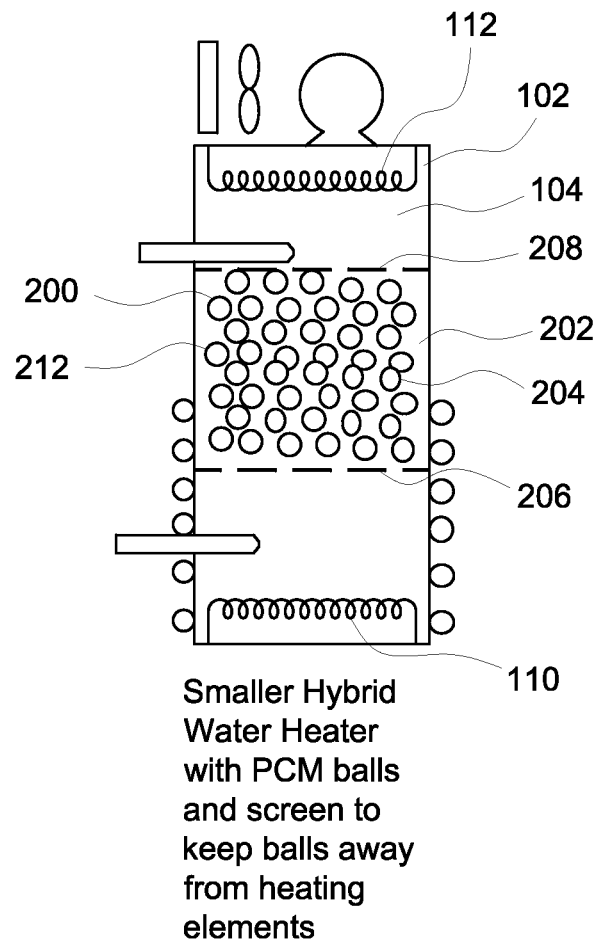
FIG. 2 illustrates an appliance incorporating a heat exchange unit in accordance with an aspect of the disclosed embodiments.
Figure 3:
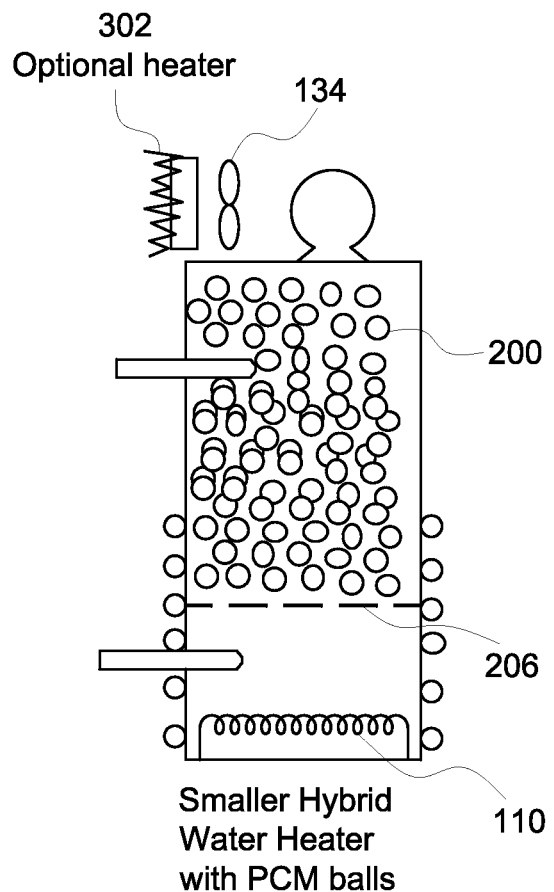
FIG. 3 illustrates an appliance incorporating a heat exchange unit in accordance with another aspect of the disclosed embodiments.

FIG. 3 illustrates an embodiment of the water heater storage tank 100 with only one heating element 110. By removing the upper heating element 112 shown in FIG. 2, the number of container assemblies 202 that can be disposed within the chamber 104 can be increased. The additional heat that is stored and provided by the container assemblies 202 is generally sufficient to make up for the eliminated heating element 112. In one embodiment, as shown in FIG. 3, an optional or auxiliary heater 302 can be used in conjunction with the heat pump system 130. The auxiliary heater 302 will increase the temperature of the ambient air entering the evaporator 134. The increase in temperature of the ambient air can generally increase the capacity of the heat pump system 130. This will provide more heat to the water in the chamber 104 without the concern about damage to the container assemblies 202 or the phase change material 204 by the heating element 110, 112 in the event of a leak. Additionally, removing one or more of the element(s) 110, 112 from inside the chamber 104 frees up for more volume for additional container assemblies 202 and can increase heat capacity of the water heater storage tank 100.

Figure 4:
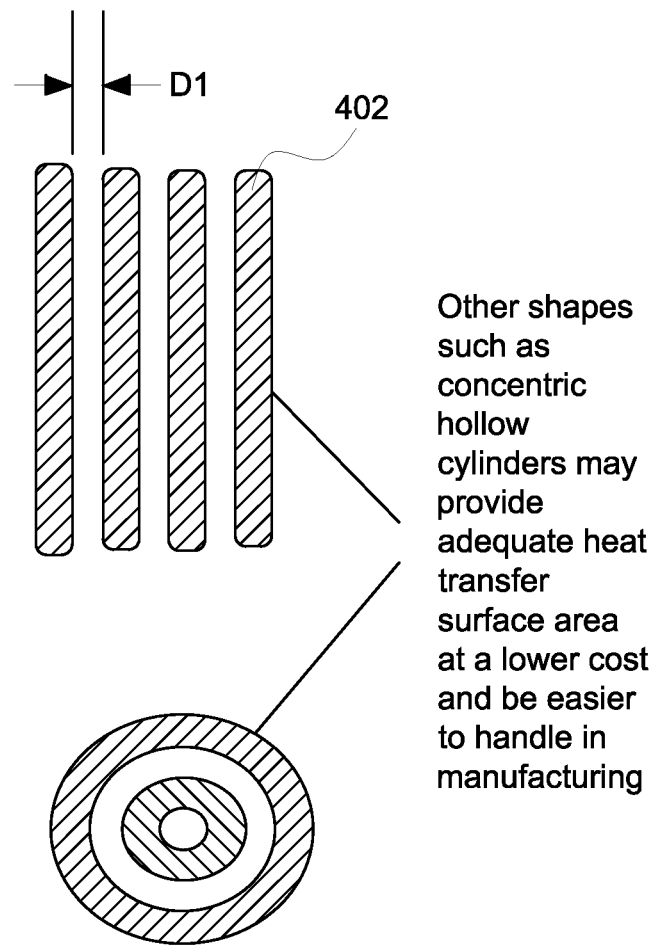
FIG. 4 illustrates an exemplary geometry for a heat exchange unit including a phase change material container in accordance with aspects of the disclosed embodiments.

Although FIGS. 2 and 3 refer to the use of spherically shaped container assemblies 202 for containing the phase change material 204, in alternate embodiments, other shapes and configurations may be utilized. For example, referring to FIG. 4, in one embodiment, the container assembly 202 can comprise concentric hollow cylinders 402 that provide adequate heat transfer surface area and contain the phase change material 204. As shown in FIG. 4, the concentric hollow cylinders 402 can be placed one inside of another and/or stacked and are spaced apart by a suitable distance D1. In one embodiment, the hollow cylinders 402 can rest on the lower retaining screen member 206.

Figure 5:
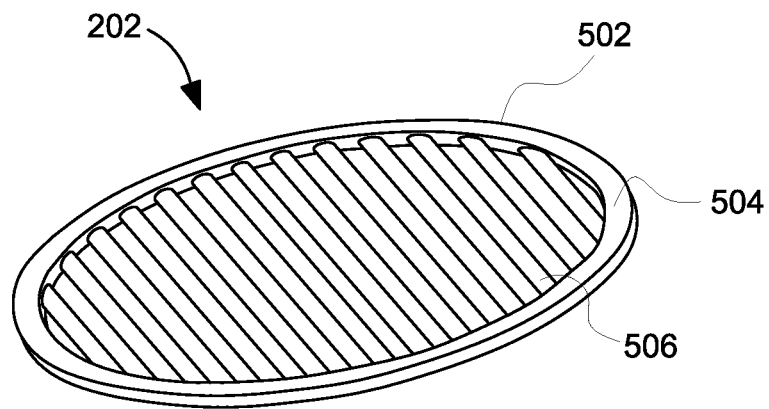
FIG. 5 illustrates a perspective view of an exemplary heat exchange unit including a phase change material in accordance with aspects of the disclosed embodiments.

FIG. 5 illustrates another example of a container assembly 202 that can be used in conjunction with the aspects of the disclosed embodiments. In this example, the container assembly 202 is in the form of a circular tube or ring member assembly 502. The shape of the ring member assembly 502 generally prevents water from bypassing the ring member assembly 502 when it is disposed within the chamber 104. The ring member assembly 502 provides a large heat transfer surface area and a large heat transfer coefficient between the ring member assembly 502 and the water. The circular or ring shape also facilitates maintaining the ring member assembly 502 in a known location within the chamber 104, which can minimize the possibility of the ring member assembly 502 coming into contact with, or being too close to the resistive heating elements 110, 112. One or more of the ring member assemblies 502 comprise the heat exchange device 200.

Figure 6:
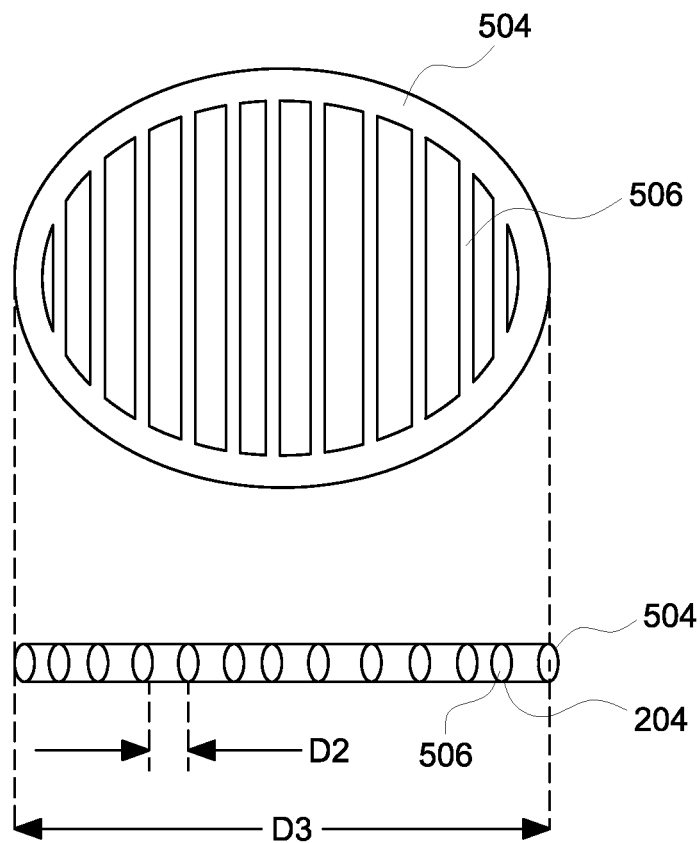
FIG. 6 is a top and side view of the exemplary heat exchange unit shown in FIG. 5.

In one embodiment, the ring member assembly 502 includes an outer ring member 504 and one or more cylindrical tubes or cross-members 506 disposed within the outer ring 504. The ring member assembly 502 can include any suitable number of cylindrical tubes 506. The cylindrical tubes 506 are generally hollow and filled with the phase change material 204. The cylindrical shape of the ring member 504 and tube 506 provides an efficient shape for heat transfer when the ring member assembly 502 is placed in an array. As is shown in FIGS. 5 and 6, the cylindrical tubes 506 can be arranged substantially parallel to one another, across the diameter of the outer ring member 504, similar to a grate, where the ends of each tube 506 are attached to respective portions of the inner wall of the ring member 504. In one embodiment, the ring member 504 is hollow and filled with the phase change material 204.

The use of the ring member assembly 502 allows a suitable spacing D2 to be provided between the rows of cylindrical tubes 506, the spacing D2 being such as to optimize the heat transfer as well as improve handling and manufacturing of the ring member assembly 502. In one embodiment, the spacing D2 is a function of the diameter D3 of the ring member 504, and can be in the range of approximately ⅕ to ¹⁄₁₅ of the diameter D3 of the ring member assembly 502. In an exemplary embodiment, the diameter of the ring member 504 is approximately 19 inches. A thickness of each ring member 504 is approximately 1 inch, while a diameter of each of the cylindrical tubes 506 is approximately ¾ of an inch. In alternate embodiments, the diameter and thickness can be any suitable dimensions that will maximize the heat transfer surface area of the container assembly 202 in the water heater storage tank 100 of the disclosed embodiments.

Figure 7:
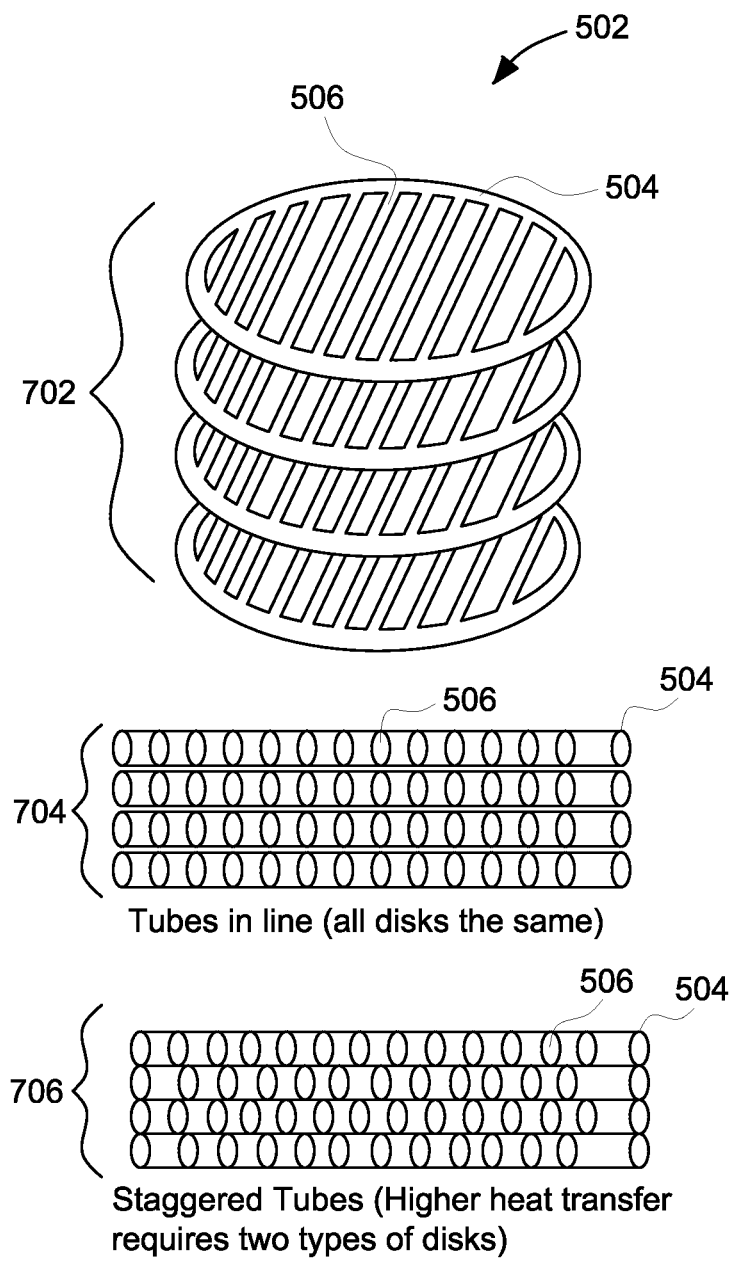
FIG. 7 illustrates an exemplary configuration for a heat exchange unit incorporating aspects of the disclosed embodiments.
Figure 8:
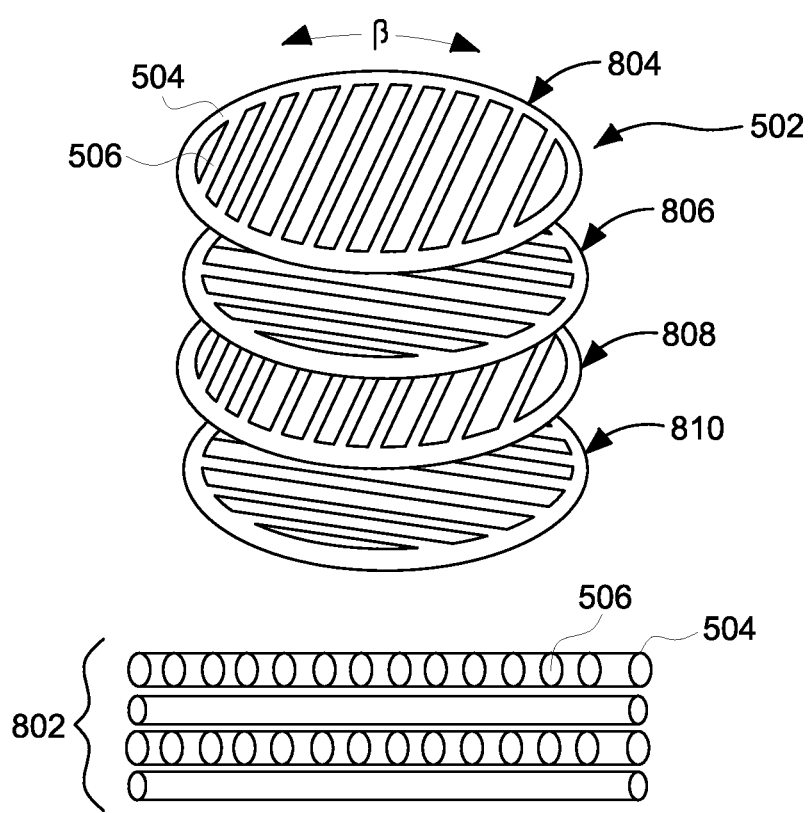
FIG. 8 illustrates another exemplary configuration for a heat exchange unit incorporating aspects of the disclosed embodiments.

In one embodiment, referring to FIG. 7, the ring member assembly 502 can be configured so that when multiple ring member assemblies 502 are arranged in a stack 702, the cylindrical tubes 506 form either an inline array stack 704, or a staggered array stack 706. In one embodiment, referring to FIG. 8, the ring member assemblies 502 can be stacked in a matrix style stack arrangement 802, where adjacent ring member assemblies 502 in the stack 802 are turned or rotated relative to each other. The angular position β of one ring member assembly 502 will vary relative to an adjacent ring member assembly 502. As a result, the cylindrical cross-members 506 of each adjacent ring member assembly 502 will cross each other and the stack 802 will provide a greater heat transfer coefficient. For example, as shown in FIG. 8, the orientation of the cylindrical tubes 506 of ring member 806 are at an angle of approximately 90 degrees relative to the cylindrical tubes 506 of ring members 804 and 808, which can result by the rotation of one or more of the ring members 804, 806 and 808. Similarly, ring member 808 is rotationally oriented relative to ring members 806 and 810. Although an angular rotation of approximately 90 degrees between adjacent ring member assemblies 502 is illustrated in this example, in alternate embodiments any suitable angle of rotation between adjacent ring member assemblies 502 can be used that enhances heat transfer from each ring member assembly 502 to the water within the chamber 104. In one embodiment, a heat exchange assembly 200 comprises a stack of 10-15 ring member assemblies. In alternate embodiments, the heat exchange assembly 200 can comprise any suitable number of ring member assemblies 502.

The ring shape of each ring member assembly 502 allows the ring member assembly 502 to be suitably positioned within the chamber 104. In one embodiment, a ring member assembly 502 can be placed on top of the lower retaining screen 204 that is illustrated in FIG. 2. Additional ring member assemblies 502 can then be stacked, one on top of another, until the desired number of ring member assemblies 502 are positioned within the chamber 104 and form the heat exchange device 200. Examples of stacked ring member assemblies 502 are shown in FIGS. 7 and 8.

In one embodiment, referring to FIG. 1, a retaining member 118, such a protruding edge member, lip or a clip, is positioned on an inside surface of the chamber 104 and is used to support and retain the ring member assembly 502 in a known position within the chamber 104. In one embodiment, the retaining member 118 can be contiguous around the inner surface of the chamber 104. Alternatively, the retaining member 118 can comprise separate elements, individually positioned around the inside surface of the chamber 104.

The aspects of the disclosed embodiments generally improve the efficiency of water heaters by reducing the amount of resistive heat needed to heat the water. The inclusion of a phase change material allows for the size of the water heater to be reduced and the operating temperature of the water to be lowered. Heat exchange units comprising uniquely shaped containers filled with a phase change material are positioned within the water heater to enhance the heat transfer from the phase change material to the water. The unique shape and positioning of the heat exchange devices reduces the potential of damage from close proximity or contact with the resistive heating element in the water heater.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An appliance comprising:
   a water heater storage tank;
   a heating assembly configured to heat water within the water heater storage tank; and
   a heat exchange device disposed within the water heater storage tank in a fixed relationship relative to a position of the heating assembly, the heat exchange device comprising:
      a plurality of individual containment devices disposed in an array; wherein each of the plurality of individual containment devices comprises:
         a hollow ring member; and
         a plurality of hollow cross-members disposed within a central opening of the hollow ring member, and
      wherein one hollow ring member is disposed adjacent another hollow ring member to form the array;
      a phase change material retained within each of the plurality of individual containment devices; and
      a fluid path over and around each of the plurality of individual containment devices, wherein the water in the water heater storage tank is configured to flow in the fluid path over and around each of the plurality of individual containment devices to exchange heat directly from each of the plurality of individual containment devices prior to being discharged from the water heater storage tank.

2. The appliance of claim 1, wherein the heating assembly is a heat pump system.

3. The appliance of claim 1, wherein the heating assembly is a heat pump and a resistive heating element disposed within the water heater storage tank.

4. The appliance of claim 1, wherein the array comprises a stack of hollow ring members.

5. The appliance of claim 4, wherein an angular position of the one hollow ring member in the stack is offset from an angular position of the adjacent another hollow ring member.

6. The appliance of claim 4, wherein an angular position of the one hollow ring member is rotated approximately 90 degrees relative to an angular position of the adjacent another hollow ring member in the stack.

7. The appliance of claim 4, wherein the one hollow ring member and the adjacent another hollow ring member are oriented in a parallel relationship relative to one another.

8. The appliance of claim 1, further comprising a retaining member disposed within the water heater storage tank, the retaining member configured to retain the heat exchange device in a fixed position within the water heater storage tank.

9. The appliance of claim 8, wherein the retaining member is a lip member disposed along an inside wall of the water heater storage tank.

10. The appliance of claim 8, wherein the retaining member is a screen mesh member.

11. The appliance of claim 10, further comprising a retention member on an inner wall of the water heater storage tank and configured to retain the screen mesh member in a fixed position within the water heater storage tank.

12. A water heater for heating water, comprising:
    a water storage container;
    a heating element for heating water disposed within the water storage container; and
    a heat exchange member disposed within the water storage container, the heat exchange member containing a plurality of individual containment devices each containing a phase change material, wherein each of the plurality of individual containment devices comprises:
       a hollow ring member; and
       a plurality of hollow cross-members disposed within the hollow ring member extending from one inner wall of the hollow ring member to another inner wall of the hollow ring member, and
    wherein one hollow ring member is disposed adjacent another hollow ring member to form an array;
    the water storage container defining a fluid path for water in the water storage container to flow around and over each of the plurality of individual containment devices prior to being discharged from the water storage container, the heat exchange member being disposed in a fixed and spaced-apart relationship from the heating element.

13. The water heater of claim 12, wherein the hollow ring members are arranged in a stacked relationship.

14. The water heater of claim 13, wherein the hollow cross-members of adjacent hollow ring members in the stack are disposed at an angle relative to one another.

15. The water heater of claim 12, wherein the water heater is an electric heat pump water heater.

* * * * *